(12) United States Patent
Gibson

(10) Patent No.: US 8,998,434 B2
(45) Date of Patent: Apr. 7, 2015

(54) REFLECTIVE COLOR PIXEL

(75) Inventor: Gary Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

(21) Appl. No.: 13/876,374

(22) PCT Filed: Sep. 30, 2010

(86) PCT No.: PCT/US2010/050920
§ 371 (c)(1),
(2), (4) Date: Mar. 27, 2013

(87) PCT Pub. No.: WO2012/044303
PCT Pub. Date: Apr. 5, 2012

(65) Prior Publication Data
US 2013/0182410 A1    Jul. 18, 2013

(51) Int. Cl.
*F21V 9/16* (2006.01)
*G02F 1/1335* (2006.01)

(52) U.S. Cl.
CPC ............ *F21V 9/16* (2013.01); *G02F 1/133514* (2013.01); *G02F 1/133621* (2013.01); *G02F 2001/133521* (2013.01); *G02F 2001/133614* (2013.01); *G02F 1/133553* (2013.01); *G02F 2001/133618* (2013.01)

(58) Field of Classification Search
CPC .............................. F21V 9/16; G02F 1/133514
USPC .................................................. 362/87, 97.2
See application file for complete search history.

(56) References Cited

U.S. PATENT DOCUMENTS

| | | | |
|---|---|---|---|
| 6,210,012 B1 | 4/2001 | Broer | |
| 7,603,003 B2 | 10/2009 | Bureatea et al. | |
| 7,703,942 B2 | 4/2010 | Narendran et al. | |
| 2008/0048970 A1 | 2/2008 | Drzaic et al. | |
| 2013/0208500 A1* | 8/2013 | Gibson | 362/603 |
| 2013/0278987 A1* | 10/2013 | Sheng et al. | 359/238 |
| 2014/0293578 A1* | 10/2014 | Gibson et al. | 362/84 |

FOREIGN PATENT DOCUMENTS

| | | |
|---|---|---|
| EP | 1591984 A2 | 2/2005 |
| JP | 07-199179 A | 8/1995 |
| JP | 2002-109932 A | 4/2001 |
| JP | 2001-184921 A | 7/2001 |
| JP | 2007-005098 A | 1/2007 |

* cited by examiner

*Primary Examiner* — David V Bruce
(74) *Attorney, Agent, or Firm* — Hewlett-Packard Patent Department

(57) ABSTRACT

A reflective color pixel includes a first sub-pixel and a second sub-pixel. The first sub-pixel is for generating a first color. A color conversion layer extends through the first sub-pixel and the second sub-pixel and is disposed in a waveguide. The color conversion layer contains a luminescent material, which converts a portion of light incident on the second sub-pixel into light of the first color. The waveguide guides the light of the first color generated by the luminescent material to the first sub-pixel for emission from the first sub-pixel.

15 Claims, 6 Drawing Sheets

REFLECTIVE COLOR PIXEL

CROSS-REFERENCE TO RELATED APPLICATION

This application is a U.S. National Stage Application of and claims priority to International Patent Application No. PCT/US2010/050920, filed on Sep. 30, 2010, and entitled "REFLECTIVE COLOR PIXEL."

BACKGROUND

Reflective electronic displays are a new type of display device that is gaining popularity. For instance, reflective displays have been used in electronic book readers. In contrast to conventional flat-panel displays, such as LCD displays, that require their own light sources, reflective displays utilize ambient light for illumination to display images that can mimic the look of "ink-on-paper" printed materials. Due to the use of ambient light for illumination, reflective displays have the significant advantages of lower power consumption compared to conventional displays, and the ability to be viewed under bright ambient light. Most of the reflective displays currently commercially available are monochromatic displays, and it is desirable to have reflective displays that can produce color images with satisfactory color brightness.

BRIEF DESCRIPTION OF THE DRAWINGS

Some embodiments of the invention are described, by way of example, with respect to the following figures.

DETAILED DESCRIPTION

Figure 1:
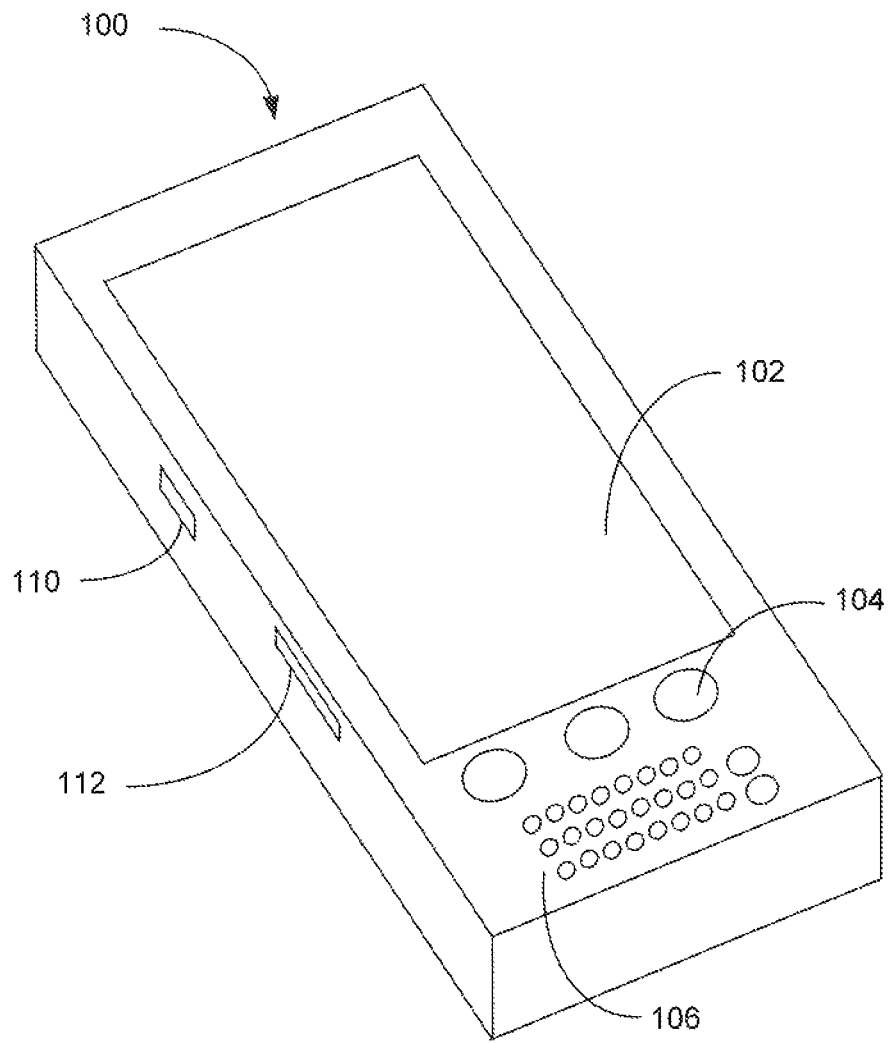
FIG. 1 is a schematic view of a reflective color display device of an example of the invention.

FIG. 1 shows an embodiment of a display device in accordance with the invention. As described in greater detail below, the display device 100 has a color display screen 102 that is capable of displaying images of high color quality while being simple in structure and easy to manufacture.

The device 100 has a built-in power source, such as a rechargeable battery, and has electronic circuitry and software for its operations. As illustrated in FIG. 1, the device IN may have buttons 104 for controlling image display functions and may have a keypad 106 for data entry. Moreover, the display screen 102 may be a touch-screen that can display control features such as scroll bars or control buttons. The display device 100 further includes means for receiving data of images to be displayed. For instance, the device 100 may have USB ports 110 for receiving data and power transmitted through a USB cable, or to receive a USB memory stick with the image date stored thereon. The device 100 may also have receptacles, such as an SD card slot 112, for other types of data storage devices. Alternatively, the device 100 may have wireless transmission capabilities for wirelessly downloading image data from a computer or a network such as the internet.

Figure 2:
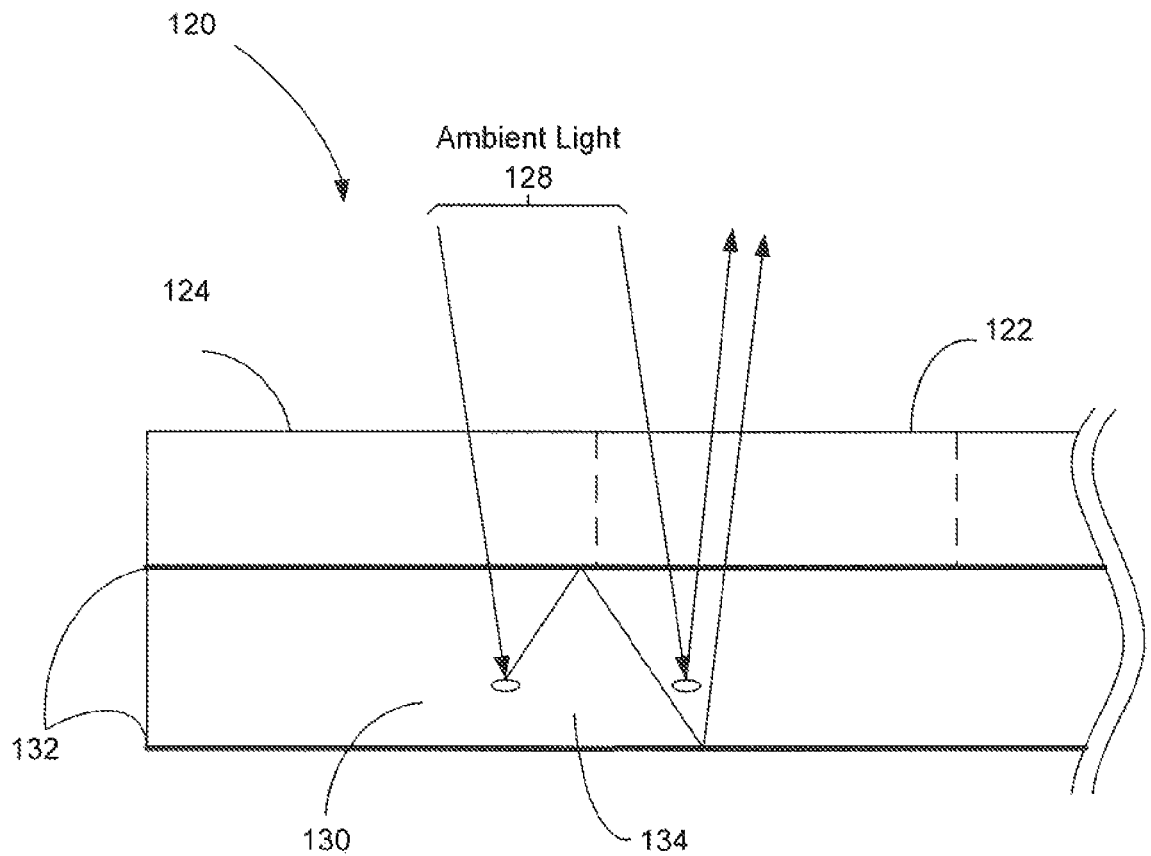
FIG. 2 is a schematic cross-sectional view of a color pixel of the reflective display device of FIG. 1 constructed according to an example of the invention to have a waveguided color conversion layer.

FIG. 2 shows a schematic representation of a pixel 120 of the display screen 102 in accordance with an embodiment of the invention. The pixel 120 has a plurality of sub-pixels, including a first sub-pixel 122 and a second sub-pixel 124. The pixel 120 has a top surface 126, upon which ambient light 128 impinges. As described in greater detail below, the ambient light 128 is used as the energy source for generating light of selected colors emitted by the sub-pixels for viewing by a user. Each sub-pixel may be responsible for emitting light in the spectral band of a given color, or for other purposes such as collection of ambient light 128 for generating the colors of the other sub-pixels. For instance, the first pixel 122 may be intended to emit red light, while the second pixel 124 may be intended to emit blue light, or be used for collecting light for generating red light for the first sub-pixel and/or light of the colors of the other sub-pixels to enhance their color lightness.

To enhance the utilization of the light 128 illuminating the reflective color pixel 120 to provide good color lightness, the pixel includes a color conversion layer 130. The color conversion layer 130 is disposed within a waveguide 132, which is positioned underneath the top pixel surface 126 and extends through the sub-pixels 122 and 124. In the example, the waveguide 132 may be formed of two generally planar reflective surfaces, and may reflect different wavelengths in different regions. The color conversion layer 130 contains a luminescent material for generating light of a color to be emitted by the first sub-pixel 122. The luminescent material absorbs a portion of the ambient light that is incident on the second sub-pixel 124, and converts it to light 134 of the color of the first sub-pixel 122. The light 134 generated by the luminescent material within the second sub-pixel 124 is guided by the waveguide 132 to the first sub-pixel 122, and is emitted by the first sub-pixel 122. In the meantime, the ambient light 128 impinging on the first sub-pixel 122 may also be used to generate light of the intended color of the first sub-pixel for emission by the first sub-pixel. Thus, the first sub-pixel 122 emits not only light generated within its area, but also light of its color generated by recycling some of the light received by the second sub-pixel 124. As a result, the first sub-pixel 122 is able to provide a color brightness that is greater than what it can produce utilizing only the ambient light it receives.

For instance, if the second sub-pixel 124 is intended to emit blue light and the first sub-pixel 122 is to emit red light, then some of the light received by the second sub-pixel 124 but not utilized to produce blue light may be converted to red light by the luminescent material. The red light 134 generated by the color conversion layer 130 within the area of the second sub-pixel is guided by the waveguide 132 to the first sub-pixel 122, and is combined with the red light generated locally by the first sub-pixel and emitted through the top surface of the first sub-pixel to provide a vibrant red color. This approach can be used to enhance the brightness of not only the red color but other primary colors, such as green and blue. In general, the luminescent waveguide channels wavelengths that are not utilized in a given sub-pixel to neighboring sub-pixels (or even neighboring pixels) where they can be used. The brightness of colors created through combinations of the primaries is boosted by recycling of light incident on one sub-pixel area to generate light of the color of a second sub-pixel, and wave-guiding it to the second sub-pixel area for emission.

Figure 3:
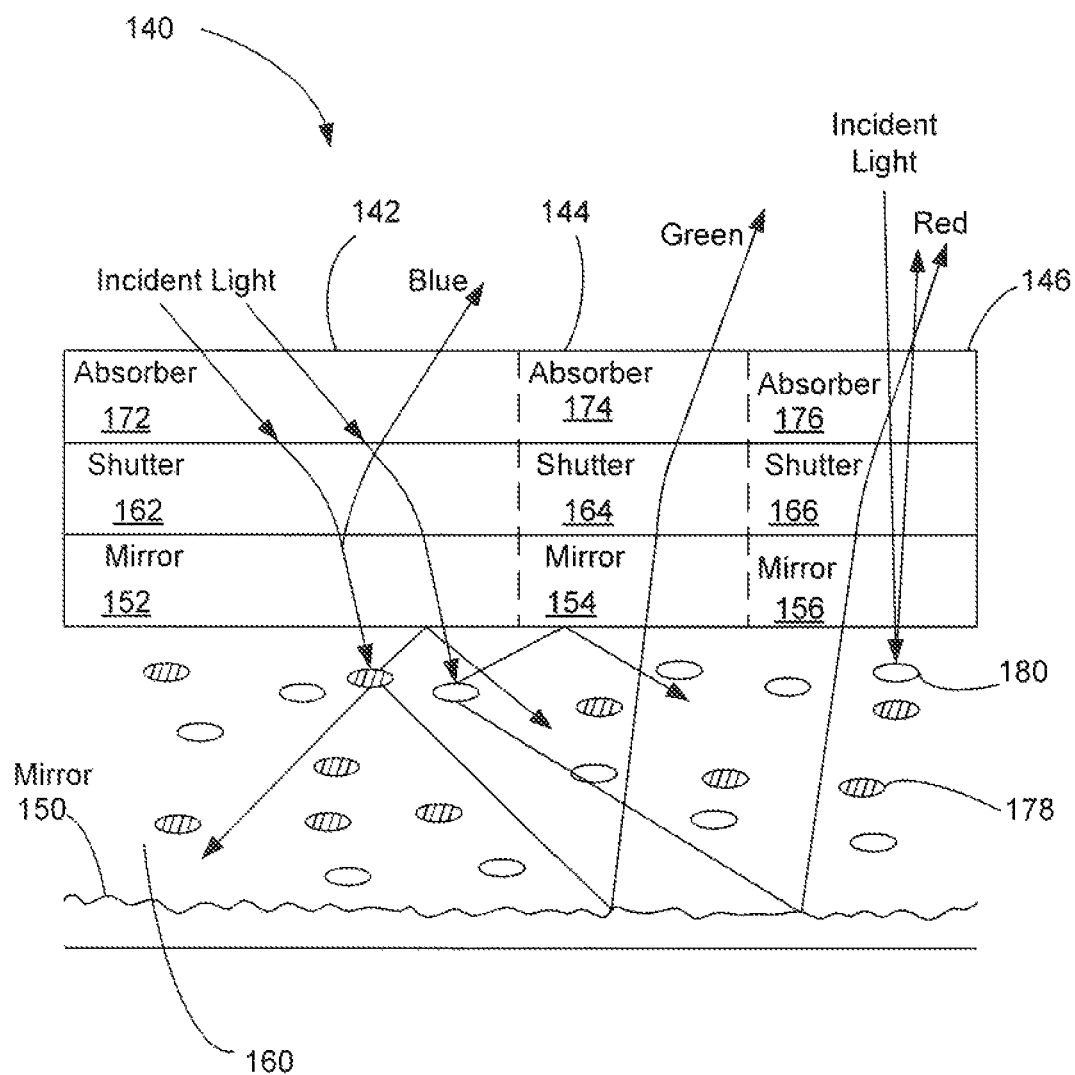
FIG. 3 is a schematic cross-sectional view of a more detailed example of a reflective color pixel.
Figure 4:
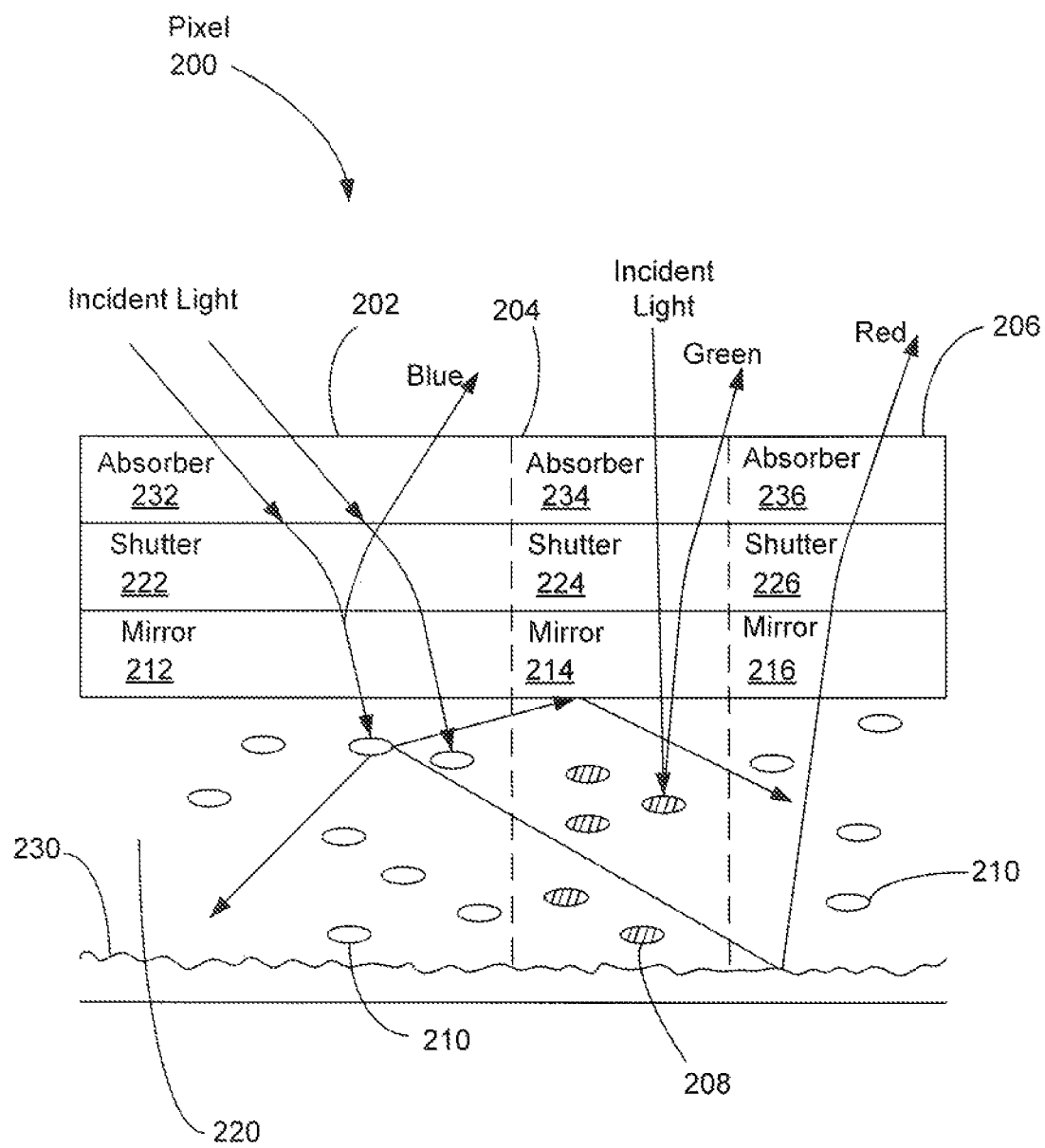
FIG. 4 is a schematic cross-sectional view of another example of a reflective color pixel.
Figure 5:
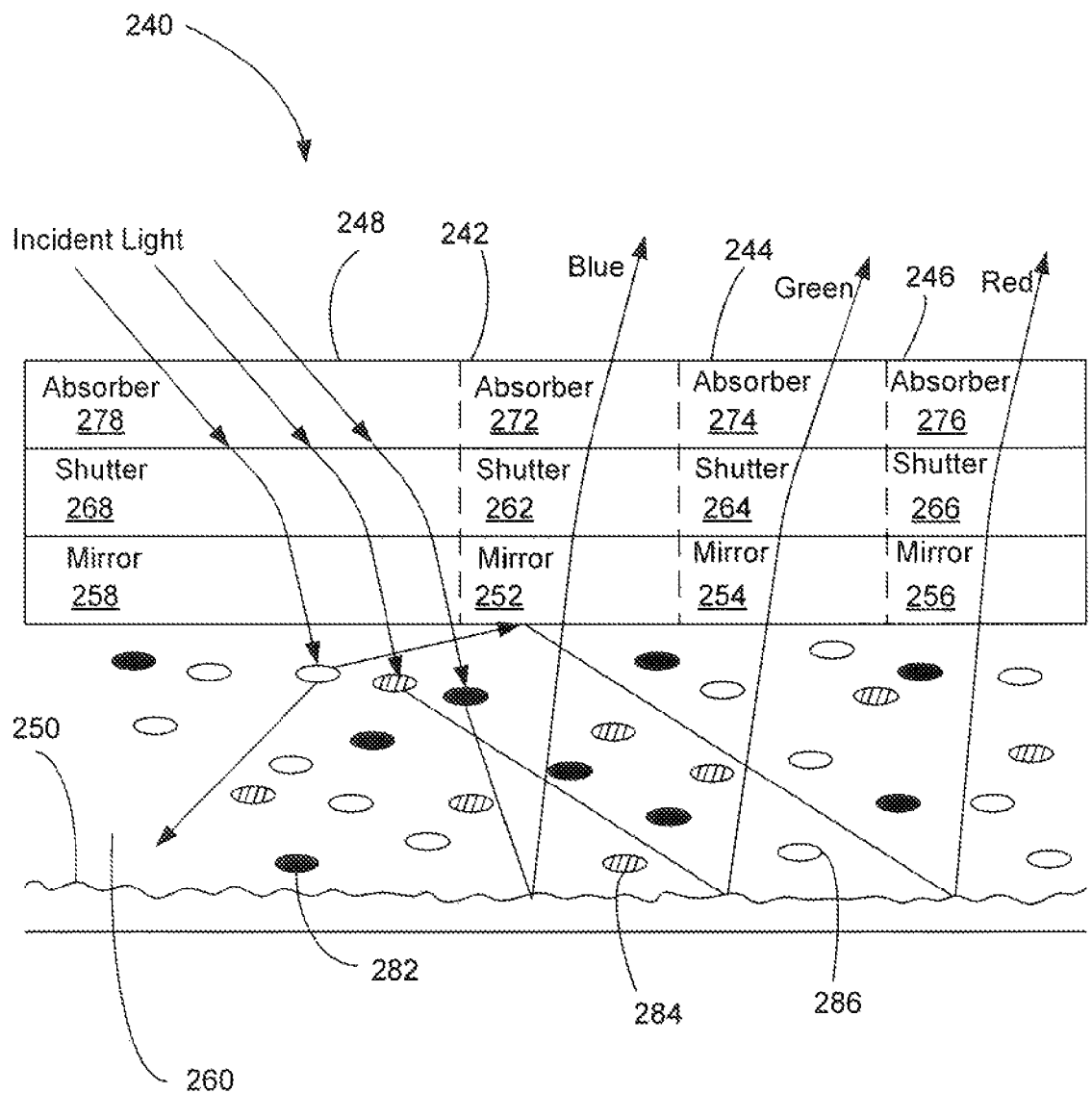
FIG. 5 is a schematic cross-sectional view of yet another example of a reflective color pixel.

FIGS. 3-5 show more detailed examples of reflective color pixels that utilize a waveguided color conversion layer to provide enhanced color brightness. Turning first to FIG. 3, in this example, the reflective color pixel 140 has three sub-pixels 142, 144, 146, for generating blue, green, and red light, respectively. As described in greater detail below, the blue sub-pixel 142 in this example generates blue light by means of wave-length specific reflection, while the green and red sub-pixels 144 and 146 use luminescence to generate their respective colors.

Each of the three sub-pixels 142, 144, and 146 has three upper layers that include an absorber, a shutter, and a mirror, respectively. The three sub-pixels also share a common bottom mirror 150 that extends across the three sub-pixels. Disposed between the upper mirrors 152, 154, 156 of the sub-pixels and the bottom mirror 150 is a color conversion layer 160 which extends through the three sub-pixels. In this regard, the upper mirrors 152, 154, 156 of the sub-pixels and the bottom mirror 150 together function as a waveguide for the color conversion layer 160. The bottom mirror 150 may be textured to provide diffused reflection. The upper mirrors 152, 154, 156 may also be slightly diffusive to avoid specular reflection highlights.

The color conversion layer 160 contains luminophores for converting ambient light received by the sub-pixels into desired colors that can be emitted by the sub-pixels for viewing. In this embodiment, two types of luminophores are used: red-emitting and green-emitting. In FIG. 3, the red luminophores 180 are illustrated as unfilled ovals, while the green luminophores 178 are illustrated as hashed ovals. In general, the red and green-emitting luminophores may each actually represent a series of luminophores that result in red and green emission, respectively. For example, the green luminophores may absorb wavelengths shorter than 540 nm, and emit in the range of 540-570 nm. The red luminophores may absorb wavelengths shorter than 600 nm, and emit in the range of 600-630 nm.

The upper mirror of the each sub-pixel is wavelength-selective such that it reflects light generated by the luminophores if the luminescent light color is that of another sub-pixel. In this example, the upper mirror 152 of the blue sub-pixel 142 reflects in three wavelength bands: blue+near UV (<485 nm), the emission band (540-570 nm) of the green luminophores 178, and the emission band (600-630 nm) of the red luminophores 180. The reflection band of blue+near UV of the mirror 152 allows the blue sub-pixel 142 to produce the blue primary color by reflecting incident ambient light in this band. The reflection of the bands of the green and red luminophores, on the other hand, allows the mirror 152 to provide the waveguiding function for the color conversion layer 160. The upper mirror 154 of the green sub-pixel 144 reflects a red light band (>600 nm) that includes the emission band of the red luminophores 180. The upper mirror 156 of the red sub-pixel 146 reflects the emission band (540-570 nm) of the green luminophores 178. Wavelength-selective mirrors with multiple narrow reflection bands, and sharp transitions, can be made from Bragg stacks. Other possibilities include photonic and plasmonic structures.

The shutters 162, 164, 166 of the sub-pixels are disposed above the corresponding wavelength-selective mirrors 152, 154, 156. They can be independently actuated to adjust the light transmission through each sub-pixel to result in the desired lightness. In some embodiments, they may be black to clear (K/clr) electro-optic (EO) shutters, which may be in the form of, for example, dichroic dye-LC guest-host systems, electrophoretic, electro-wetting, or electro-fluidic cells.

The absorbers 172, 174, and 176 are positioned above the corresponding shutters 162, 164, and 166. Putting the absorbing layers above the shutters may improve the black state, but they could be positioned below the shutters if it is easier to manufacture such a structure. The absorber 172 of the blue sub-pixel 142 absorbs (at least) the green and red wavelengths reflected by the mirror 152, hut not the blue wavelengths reflected by the mirror, so that the blue wavelengths can be emitted by the sub-pixel 142 for viewing. The absorber 174 of the green sub-pixel 144 absorbs the red wavelengths reflected by the mirror 154, so that the red portion of the incident light reflected by the mirror is not emitted to make the green sub-pixel appear red. Similarly, the absorber 176 of the red sub-pixel 146 absorbs the green wavelengths reflected by the mirror 156 so that the red sub-pixel does not appear green.

In operation, to obtain a black state, all the shutters 162, 164, and 166 of the sub-pixels 142, 144, and 146 are closed (i.e., switched to their black or absorbing state). The absorbers 162, 164, 166 above the shutters aid in obtaining a dark black state. To create a blue state, the shutter 162 of the blue sub-pixel 142 is opened to allow light to pass through, and the blue wavelengths reflected by the mirror 152 are reflected back to the viewer. The other wavelengths reflected by the mirror 152 are largely absorbed by the absorber 172. Wavelengths in the ambient light that are not reflected by the mirror 152 or absorbed by the absorber 172 reach the color conversion layer 160 and are absorbed by luminophores 178, 180 within the color conversion layer. The majority of this absorbed light is converted by the luminophores to red and green wavelengths. The red and green luminescent colors do not escape the color conversion layer 160 within the area of the blue sub-pixel 142 because they are reflected by the mirror 152. Instead, they are wave-guided over to the green and red sub-pixels 144, 146 where they are gated by shutters 164 and 166, respectively. When a blue state is desired for the overall pixel 140, the shutters 164 and 166 of the green and red sub-pixels are closed so that the green and blue luminescent colors do not contribute to the overall emission.

To create a green state, the shutter 164 of the green sub-pixel 144 is opened and the shutters 162 and 166 of the blue and red sub-pixels are closed. Red wavelengths of the light incident on the top surface of the green sub-pixel are absorbed by the absorber 174. Blue and green wavelengths of the light incident on the top surface of the green sub-pixel 144 are absorbed by the luminophores 178, 180 and converted to green and red colors. The emitted green light is returned to the viewer through the shutter 164 of the green sub-pixel and the emitted red light is reflected back into the waveguide by the mirror 154 for possible use by the red sub-pixel.

Similarly, to produce a red state, the shutter 166 of the red sub-pixel 146 is opened and the shutters 162 and 164 of the blue and green sub-pixels are closed. Most of the ambient light wavelengths incident on the red-pixel 146, other than the green wavelengths absorbed by the absorber 176, are utilized to produce red and green by the luminophores in the color conversion layer 160. Longer red wavelengths in the incident light that are not within the absorption bands of the luminophores can be directly reflected by the bottom mirror 150.

The benefit of color brightness enhancement may occur when the pixel 140 is used to create color states that are combinations of the blue, green and red primary color. For instance, to create a magenta color, the shutters 162, 166 of the blue and red sub-pixels 142, 146 are opened. In this case, blue and red colors are returned from the blue and red sub-pixels, respectively, as described above. However, additional red light is provided when wavelengths are absorbed by the luminophores in the area of the blue sub-pixel 142 and converted to red by the red-emitting luminophores 180. The luminescent red light is wave-guided to the area of the red sub-pixel 146, where it is allowed to go through the upper mirror 156, the shutter 166, and the absorber 176. Similarly, for a color that is a mixture of blue and green (e.g., cyan), the green light generated by the green luminophores 178 within the blue sub-pixel 142 may be waveguided to the green sub-pixel 144 for emission. Also, for a color comprising green and red (e.g., yellow), the red light generated by the red luminophores 180 within the green sub-pixel 144 can be waveguided to and emitted through the red sub-pixel 146.

To create white, all the shutters 162, 164, 166 of the three sub-pixels are opened if the areas of the sub-pixels are chosen such that this results in a balanced white. Alternatively, some shutters can be partially opened to produce a balanced white if other sub-pixel area ratios are desired. In principle, a bright white state can be obtained if the internal emission, energy transfer, and out-coupling efficiencies are reasonably high.

The desired absorption and emission characteristics of the reflective color pixel can be achieved within the luminophore-containing color conversion layer 160 in a variety of ways. For example, the green emission can result from a series of dyes incorporated in a transparent polymer matrix. All but the first one of these dyes absorb in a wavelength band that overlaps strongly with the emission band of the previous one, allowing Förster energy transfer from one dye to the next in the series. Dyes used for this purpose are sometimes called relay dyes. Thus, the green luminophores 178 in FIG. 3 may comprise a series of relay dyes. Dyes can be chosen such that together they absorb all near-UV, blue, and green incident wavelengths up to some cutoff that is the longest wavelength absorbed by the last dye, which emits in the green. In this way, a large fraction of the incident light below this cutoff wavelength that reaches the color conversion layer 160 can be converted to green. Green wavelengths between the green absorption cutoff and emission wavelengths (there is a gap due to the Stokes shift) can be reflected by the bottom mirror 150 to improve the brightness of states that utilize green. Similarly, the luminophores 180 for red emission can comprise a series of relay dyes terminating in a red-emitting dye. This series can be chosen so as not to overlap with the wavelength band covered by the green dyes. In this way, absorption of the green emission of the final green relay dye by one of the red relay dyes may be avoided.

Alternatively, some absorption of the green emission by the dyes feeding the red emission can be allowed. The fraction of green emission converted to red can be adjusted by choosing the appropriate concentrations of the dyes involved. This latter approach may be useful in that it can allow better utilization of ambient light at wavelengths near the green emission band. Otherwise, completely avoiding energy transfer from the green emitter to the red relay dyes might necessitate not absorbing some of the wavelengths between the green emission band and the shortest wavelength absorption of the red relay dyes, particularly when using dyes with tails in their absorption and emission spectra. Including the possibility of some energy transfer from the green to red channels also allows more leeway in designing the relative areas of the sub-pixels.

In an alternative example, the wavelength conversion layer 160 may be formed into two layers, with the red-emitting luminophores in one and the green-emitting luminophores in the other. The two layers may be index-matched so that they behave like a single waveguide. This arrangement would prevent Förster energy transfer from green to red. Some of the green emitted light might get directly absorbed by the red luminophores, but that could be acceptable depending on the desired ratio of green and red light to be generated in the waveguide. In this regard, the direct absorption of the green emitted light can be made to be less than the loss that would occur via Förster energy transfer when the red and green luminophores are placed in the same layer. For instance, the absorption band of the red luminophores can be designed such that only part of the green emitted light will be absorbed. An extension of this bi-layer approach is to have the green luminophores in the top layer and the red in the lower layer, and place a green-reflecting mirror between them. This would add complexity but would relax the requirements on the absorption bands of the luminophores.

Alternatively, other combinations of absorbers/sensitizers and emitters can be employed. For example, luminescent polymers, oligomers, or monomers, or semiconducting nanoparticles can be used as emitters and/or absorbers/sensitizers in the schemes described above. Luminescent polymers or oligomers can also be used as an absorbing host matrix for other luminescent polymers, oligomers, or monomers, or for semiconducting nanoparticles.

FIG. 4 shows another example of a reflective color pixel 200. In this example, in contrast with the pixel 140 shown in FIG. 3, different sets of luminophores are doped into different sub-pixel areas of the waveguided color conversion layer 220. For example, a series of relay dyes 210 covering nearly the entire visible spectrum and culminating in red emission can be used in the color conversion layer 220 in the area of the red sub-pixel 206, a series of relay dyes 208 absorbing wavelengths shorter than green and culminating in green emission can be employed in the color conversion layer 220 in the area of the green sub-pixel 204, and the series of relay dyes 210 chain can also be employed in the area of the blue sub-pixel 202. This configuration increases the manufacturing complexity of the color conversion layer 220 but improves the utilization of ambient light in some cases. When creating a red state, for instance, the shutter of the red sub-pixel is open and the majority of light reaching the waveguide layer will be converted to the desired color, red, rather than both red and green. Color combinations utilizing the blue sub-pixel 202 would enhance red production due to the recycling of some of the non-blue light incident on the blue sub-pixel into red luminescent light and waveguiding it to the red sub-pixel 206, in the same way explained above in connection with the embodiment of FIG. 3.

Doping different portions of the luminescent waveguide differently can also reduce the need for some of the wavelength-selective mirrors and associated absorbers of the sub-pixels, or allow their bandwidths to be decreased. For instance, in the example of FIG. 4, the mirror 212 in the blue sub-pixel 202 does not have to reflect the wavelength range (540-570 nm) of the green luminescent light, and the corresponding absorber 232 does not have to absorb it. The mirror 216 and absorber 236 in the red sub-pixel 206 may also be removed because they are not needed. As before, the shutter 226 of the red sub-pixel 206 is opened to produce a red state. The majority of light incident on the top surface of the red sub-pixel 206 with wavelengths below 600 nm is converted to red light at 600-630 nm by the red luminophores 210 in the color conversion layer 220 within the red sub-pixel. Most of this red light will rapidly escape the color conversion layer 220 within the red sub-pixel.

Similarly, wavelengths longer than 630 nm incident on the red sub-pixel 206 will mostly be reflected back by the bottom mirror 230 to the viewer. To create a green state, the shutter 224 of the green sub-pixel 204 is opened. The resulting green emission by the green luminophores 208 in the color conversion layer 220 within the green sub-pixel 204 primarily escapes through the shutter 224, removing the need for a green reflecting mirror in the red sub-pixel 206. Also, in this example, the blue sub-pixel 202 does not introduce green light to the waveguided color conversion layer 220 either. Overall, more ambient light incident on the pixel 200 may reach the color conversion layer because of the reduced bandwidths of the mirrors and absorbers of the sub-pixels.

FIG. 5 shows another example of a reflective color pixel 240. In this example, the pixel 240 has four sub-pixels 242, 244, 246, and 248. The sub-pixel 248 is used mainly as a light collection area, while the sub-pixels 242, 244, and 248 are for generating the blue, green, and red primary colors, respectively. The light collection sub-pixel 248 may be made larger than the red, green, and blue sub-pixels 242, 244, 246. As long as the overall pixel dimensions are sufficiently small, the viewer will not be able to tell that the observed light is coming from a relatively small fraction of the overall pixel area. Each of the sub-pixels 242, 244, 246 includes a shutter, an absorber, and a mirror. The pixel 240 also includes a bottom mirror 250, A color conversion layer 260 containing a luminescent material is disposed between the upper mirrors 252, 254, 256, 258 and the bottom mirror 250, and extends through the four sub-pixels. The upper mirrors 252, 254, 256, 258 of the sub-pixels and the bottom mirror 250 function as a waveguide for light generated by the luminescent material in the color conversion layer.

In this example, luminescence is utilized to generate all three primary colors. To that end, the color conversion layer 260 contains blue luminophores 282, green luminophores 284, and red luminophores 286, which are illustrated in FIG. 5 as solid ovals, hashed ovals, and unfilled ovals, respectively. The blue luminophores 282 may absorb wavelengths shorter than 455 nm, and emit in the range of 455-485 nm.

For the waveguide function, the upper mirrors 252, 254, 256 and 258 of the sub-pixels have their selected reflection ranges. The mirror 258 of the light collection sub-pixel 248 reflects the emission bands of the blue, green, and red luminophores (455-458 nm+540-570 nm+600-630 nm), and may also reflect wavelengths greater than 630 nm if too much of such light is directly reflected without being channeled into waveguide modes. The mirror 252 of the blue sub-pixel reflects the green luminescence band (540-570 nm) and red light that includes the red luminescence (>600 nm). The mirror 254 of the green sub-pixel reflects the blue luminescence band (455-485 nm) and the red light (>600 nm). The mirror of the red sub-pixel reflects the blue luminescence band (455-485 nm) and the green luminescence band (540-570 nm). The absorbers 272, 274, 276, 278 of the sub-pixels have absorption bands that match the reflection bands of the corresponding mirrors 252, 254, 256, 258. Each of the shutters 262, 264, 266, and 268 can be independently controlled to adjust the light transmission through the respective sub-pixel.

To set the pixel 240 to red, the shutter 268 of the light collection sub-pixel 248 and the shutter 266 of the red sub-pixel 246 are opened, while the shutters 262 and 264 of the blue and green sub-pixels 242 and 244 remain closed. For light incident on areas of the light collection sub-pixel 248 and the red sub-pixel 246, most wavelengths of light not absorbed by the absorbers 278 and 276 of these two sub-pixels are absorbed by the luminophores in the light conversion layer 260 and converted to the red, green and blue luminescent emission bands. The red luminescent light eventually escapes through the shutter 266 of the red sub-pixel 246. In addition, wavelengths of red ambient light incident on the red sub-pixel 246 that are longer than the absorption band of the red emitting luminophores 286 are reflected by the bottom mirror 250 and escape through either the red sub-pixel 246 or the light collection sub-pixel 248. The net result is a bright red state. Some of the red ambient light incident on these two sub-pixels is directly returned to the viewer by the mirror 258 or the bottom mirror 250. In addition, a large fraction of the light below the red emission band, over a majority of the pixel area, is absorbed and re-emitted as red and returned to the viewer. The majority of light between 570 and 600 nm (i.e., between green and red) incident over a majority of the pixel can be converted to red, assuming that lower wavelengths are converted to green or blue. The resulting red state can be significantly brighter than, for example, simply reflecting a third of the red light incident on the overall pixel. Similarly, the brightness of the white state can be reasonably high.

Figure 6:
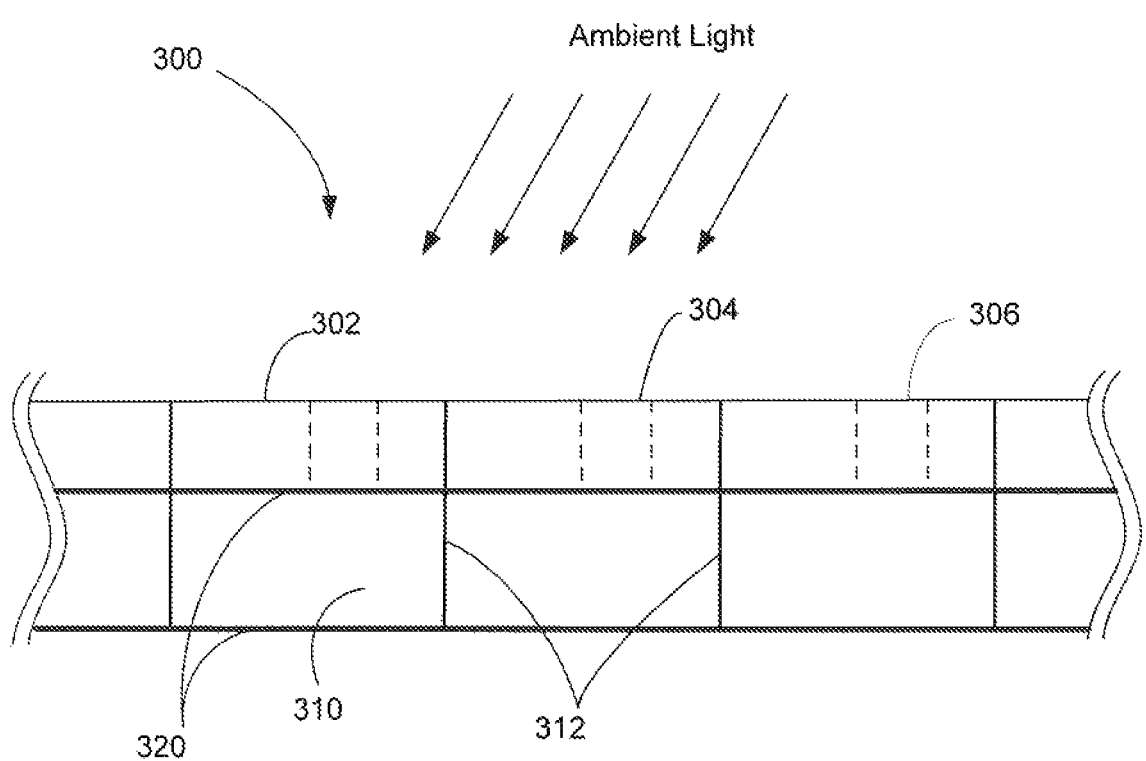
FIG. 6 is a schematic cross-sectional view of a display with adjacent reflective color pixels sharing a waveguided color conversion layer according to an example of the invention.

In some embodiments, further enhancement to the brightness of the reflective display may be obtained by allowing the recycled light to be shared by multiple pixels. An example of such an arrangement is shown in FIG. 6. In this example, multiple adjacent reflective color pixels 302, 304, 306 of a display 300 have a waveguided color conversion layer 310 that extends through the pixels. Each of the pixels may have sub-pixels, which may be constructed in ways shown in the examples of FIGS. 3-5. For simplicity of illustration, only three pixels are explicitly shown, but it should be understood that the waveguided color conversion layer may extend through more than three pixels and in some embodiments may go under the entire display. The color conversion layer 310 contains a luminescent material, which may have different luminophores for generating different colors by absorbing light incident on the pixels and reaching the color conversion layer. The color conversion layer 310 is contained within a waveguide 320, such that luminescent light generated within one pixel may be guided to the neighboring pixels. The waveguide 310 may be formed of two generally planar reflective surfaces, and may reflect different wavelengths in different regions, as described earlier in connection with the examples of FIGS. 3-5. To make the waveguided color conversion layer 310 effectively continuous from pixel to pixel, the refractive index of the material containing the luminophores can be matched to any transparent walls 312 used to separate the pixels and their sub-pixels. By making the waveguided color conversion layer 310 continuous through multiple pixels, wavelengths of luminescent light not used by one pixel may diffuse to a neighboring pixel where they are utilized. This may require more sophisticated algorithms for choosing the states of the shutters of the sub-pixels as the color coordinates and lightness of a given pixel would depend on the states of neighboring pixels.

In the examples of FIGS. 3-5, mirrors are utilized to form the waveguides for the color conversion layers of the pixels. In some other embodiments, it may be feasible to omit some or all of the absorber layers and upper mirrors, or decrease the wavelength range over which these layers act. For instance, simplifications may be made by (i) including structures at the top or bottom surface of the waveguide, or within it, that preferentially scatter desired wavelengths either randomly or in preferential directions within given sub-pixel areas, and (ii) making the index of refraction of the waveguide fairly high and inserting a low index layer immediately above it, thereby increasing the angular range for total internal reflection at the waveguide's surface.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A reflective color pixel comprising:
   a first sub-pixel and a second sub-pixel, the first sub-pixel for generating a first color; and
   a color conversion layer extending through the first sub-pixel and the second sub-pixel, the color conversion layer being disposed in a waveguide and containing a luminescent material, the luminescent material converting a portion of light incident on the second sub-pixel into light of the first color, and the waveguide guiding the light of the first color generated by the luminescent material to the first sub-pixel for emission from the first sub-pixel.

2. A reflective display pixel as in claim 1, wherein the first color is selected from the group of red, green and blue.

3. A reflective color pixel as in claim 1, wherein the second sub-pixel is for emitting light of a second color.

4. A reflective color pixel as in claim 3, wherein the second color is blue and the first color is red or green.

5. A reflective color pixel as in claim 1, wherein the luminescent material includes luminophores comprising relay dyes for generating light of the first color.

6. A reflective color pixel as in claim 1, wherein each of the first and second sub-pixels has an upper mirror disposed on a first side of the color conversion layer, and the pixel has a bottom mirror disposed on a second side of the color conversion layer, the upper mirrors of the sub-pixels and the bottom mirror forming the waveguide for the color conversion layer.

7. A reflective color pixel as in claim 6, wherein each of the first and second sub-pixels further includes a shutter and an absorber, the shutter controlling light transmission through the sub-pixel and the absorber absorbing a portion of light reflected by the upper mirror of the sub-pixel.

8. A reflective color pixel comprising:
   a first sub-pixel for emitting a first color;
   a second sub-pixel for emitting a second color;
   a third sub-pixel for emitting a third color;
   a color conversion layer extending through the first, second and third sub-pixels, the color conversion layer containing a luminescent material for generating light of the first color and light of the second color;
   a waveguide in which the color conversion layer is disposed, the waveguide guiding light generated by the luminescent material in one sub-pixel to the other sub-pixels.

9. A reflective color pixel as in claim 8, wherein each of the first, second and third sub-pixels includes an upper mirror disposed on a first side of the color conversion layer, and the pixel has a bottom mirror disposed on second side of the color conversion layer, the upper mirrors of the sub-pixels and the bottom minor forming the waveguide.

10. A reflective color pixel as in claim 9, wherein the color conversion layer within the first sub-pixel contains luminophores for generating light of the third color, the color conversion layer within the second sub-pixel contains luminophores for generating light of the second color, and the conversion layer within the third sub-pixel contains luminophores for generating light of the third color.

11. A reflective color pixel as in claim 8, further including a fourth sub-pixel for collecting light, wherein the color conversion layer extends through the fourth sub-pixel.

12. A reflective color pixel as in claim 11, wherein the luminescent material contains luminophores for the generating light of the first, second, and third colors.

13. A reflective color display comprising:
   a plurality of pixels, each pixel having a first sub-pixel for emitting a first color, a second sub-pixel for emitting a second color, and a third sub-pixel for emitting a third color, a color conversion layer extending through the sub-pixels and containing a luminescent material for generating light of the first and second color, a waveguide containing the color conversion layer configured to guide a portion of light generated by the luminescent material within one sub-pixel to the other sub-pixels.

14. A reflective color display as in claim 13, wherein the color conversion layer extends through multiple pixels.

15. A reflective color display as in claim 13, where the pixel further includes a fourth sub-pixel for light collection, and the luminescent material also generates light of the third color.

* * * * *

UNITED STATES PATENT AND TRADEMARK OFFICE
CERTIFICATE OF CORRECTION

PATENT NO. : 8,998,434 B2
APPLICATION NO. : 13/876374
DATED : April 7, 2015
INVENTOR(S) : Gary Gibson et al.

Page 1 of 1

It is certified that error appears in the above-identified patent and that said Letters Patent is hereby corrected as shown below:

In the Claims

In column 9, line 14, in Claim 2, delete "display" and insert -- color --, therefor.

In column 10, line 10, in Claim 9, delete "minor" and insert -- mirror --, therefor.

Signed and Sealed this
Fifteenth Day of September, 2015

Michelle K. Lee
*Director of the United States Patent and Trademark Office*